May 1, 1928.   1,667,856
R. K. GULLBERG
CHAFF SEALING DEVICE FOR COFFEE CUTTING MACHINES
Filed March 27, 1925
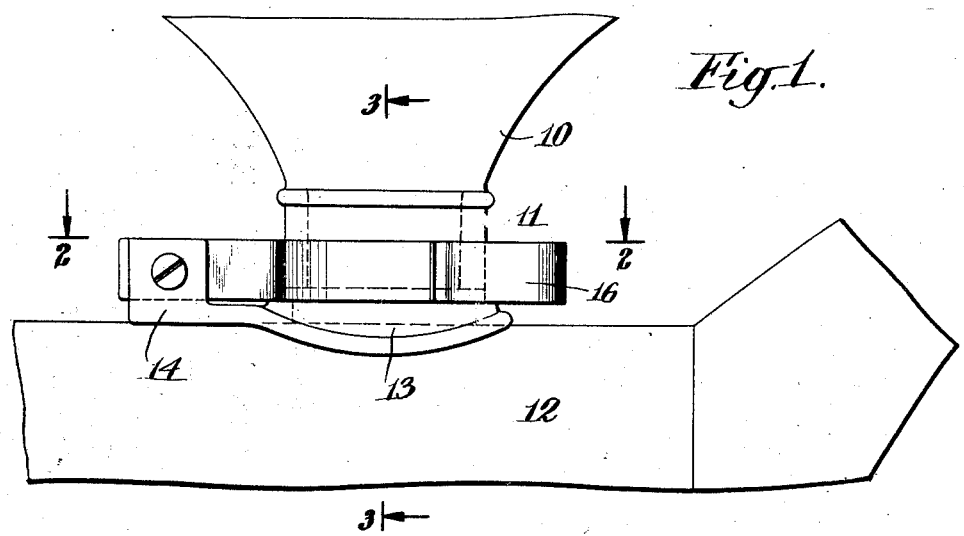
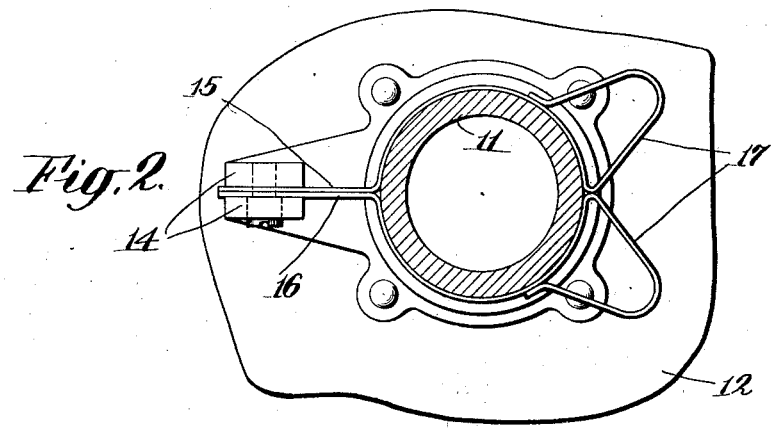
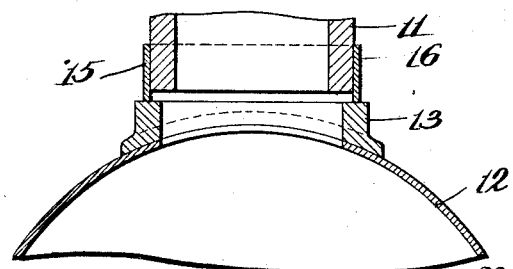
Inventor
Roy K. Gullberg
By his Attorney
Cooper, Kerr & Dunham Patented May 1, 1928.

1,667,856

UNITED STATES PATENT OFFICE.

ROY KARL GULLBERG, OF DAYTON, OHIO, ASSIGNOR TO DAYTON SCALE COMPANY, OF DAYTON, OHIO, A CORPORATION OF NEW JERSEY.

CHAFF-SEALING DEVICE FOR COFFEE-CUTTING MACHINES.

Application filed March 27, 1925. Serial No. 18,680.

In the grinding of coffee it is the common practice to provide a can-like receptacle under the delivery spout of a coffee cutting or grinding machine. These machines when in operation cut the coffee and during this cutting there is a considerable amount of chaff broken off from the coffee berry. This chaff and other fine dust is not all deposited in the receptacle but blows about and in time covers the machine and the receptacle thus causing both to appear unsightly.

The present invention has for its object the provision of a novel form of receptacle which may be readily adjusted and placed in position under the delivery spout of a coffee cutting machine, which receptacle will substantially seal the openings around the end of the delivery spout thereby materially minimizing the escape of chaff and dust when the coffee cutter is in operation. The parts are so arranged that the coffee receptacle may be readily placed in position without the necessity of manual manipulations or adjustments of the sealing device.

In the drawings,

Fig. 1 is a side view of a portion of a receptacle in cooperative relation to the delivery spout of a coffee cutting machine.

Fig. 2 is a detail sectional view taken on line 2—2 of Fig. 1.

Fig. 3 is a similar detail view taken on line 3—3 of Fig. 1.

In more detail in the drawings, 10 represents the delivery spout of a coffee cutting machine this spout terminating in an annular portion 11 shown cross sectioned in Fig. 2. 12 represents the upper portion of a coffee receptacle, which receptacle at its top is provided with an annular member 13 adapted to fit under the annular delivery conduit 11. Suitably fixed to the receptacle 12 is a bracket portion 14 notched or slotted to receive two spring members 15 and 16. These spring members are curved to correspond with the exterior of the annular member 11 and at their ends remote from bracket 14 are provided with outwardly flared camming ends 17. In placing the receptacle under the delivery spout the receptacle 12 is introduced from left to right. Camming elements 17 are cammed outwardly by the annular conduit 11 and afterwards snap into position substantially as shown in Fig. 2. In this way the major part of the aperture between parts 11 and 13 is sealed by the members 15 and 16.

It is obvious that spring clips may be carried upon the delivery spout instead of the receptacle but preferably the arrangement is with the clip carried upon the receptacle.

What I claim is:—

1. A sealing device for a receptacle adapted for cooperation with a delivery spout comprising a pair of vertically disposed blade-like spring clip members adapted to substantially seal the aperture between the receptacle and the delivery spout by gripping the latter and to flex in horizontal directions to allow the receptacle to be placed in position.

2. A sealing device for a receptacle adapted for cooperation with a delivery spout, said device comprising spring clip members with portions thereof arranged to substantially seal the aperture between the receptacle and the delivery spout by gripping the latter, said clip members having outwardly flared ends which serve to cam the clips outwardly and flex the same when the receptacle is placed in position.

3. A sealing device for a receptacle adapted for cooperation with a delivery spout, said device comprising a pair of blade-like spring clip members mounted to flex in horizontal directions, said clip members having portions thereof extending around the delivery spout and abutting together to form a seal between the receptacle and said spout when said receptacle is placed in position, said clip members being mounted to flex outwardly and apart when the receptacle is being placed in position.

4. A sealing device for a receptacle adapted to cooperate with a delivery spout comprising a pair of flexible bands for resiliently gripping the spout, each of said bands being normally urged to move in opposite directions and into contact with the spout to seal the aperture between the receptacle and the spout.

5. A sealing device for a receptacle adapted to cooperate with a delivery spout comprising a flexible band-like device for gripping the periphery of the spout, said device having terminal portions, parts of which contact each other and other parts of which contact portions of said device.

6. A sealing device for a receptacle adapted to cooperate with a delivery spout comprising a flexible split band-like device for forcibly resiliently gripping the surface of said spout, the gripping force of said device being equally distributed along all points of said spout surface, and said device having an inherent radial resilient action.

In testimony whereof I hereto affix my signature.

ROY KARL GULLBERG.